United States Patent [19]
Propst

[11] Patent Number: 4,974,648
[45] Date of Patent: Dec. 4, 1990

[54] IMPLEMENT FOR LOPPING FELLED TREES

[75] Inventor: Johann Propst, Vienna, Austria

[73] Assignee: Steyr-Daimler-Puch AG, Vienna, Austria

[21] Appl. No.: 479,654

[22] Filed: Feb. 14, 1990

[30] Foreign Application Priority Data

Feb. 27, 1989 [AT] Austria .................................. 429/89

[51] Int. Cl.⁵ .............................................. B27L 1/00
[52] U.S. Cl. .................... 144/2 Z; 144/3 D; 144/343; 144/246 C; 144/246 F
[58] Field of Search ............. 144/2 Z, 3 D, 246 B, 144/246 D, 246 F, 343

[56] References Cited

U.S. PATENT DOCUMENTS

| 3,464,468 | 9/1969 | Thompson et al. | 144/3 D |
| 3,542,099 | 11/1970 | Gibson | 144/3 D |
| 4,515,192 | 5/1985 | Ericksson . | |

FOREIGN PATENT DOCUMENTS

| 2811660 | 9/1984 | Fed. Rep. of Germany . |
| 2855430 | 12/1984 | Fed. Rep. of Germany . |
| 3712302 | 10/1987 | Fed. Rep. of Germany . |
| 3712303 | 10/1987 | Fed. Rep. of Germany . |

Primary Examiner—W. Donald Bray
Attorney, Agent, or Firm—Marmorek, Guttman & Rubenstein

[57] ABSTRACT

An implement for lopping felled trees comprises a frame, which is adapted to be suspended from a lifting tackle and is provided with gripping members for engaging a treetrunk from below, with feeding means for imparting a longitudinal movement to the treetrunk and with lopping tools, which are distributed around the periphery of the treetrunk, and is preferably provided with a cross-cutting tool, which is operable to move transversely to the longitudinal feeding direction. In order to reduce the friction incurred during the longitudinal feed movement, at least one of the grippers constitutes a carrier for a roller, which is rotatable on an axis that is transverse to the feeding direction.

14 Claims, 2 Drawing Sheets

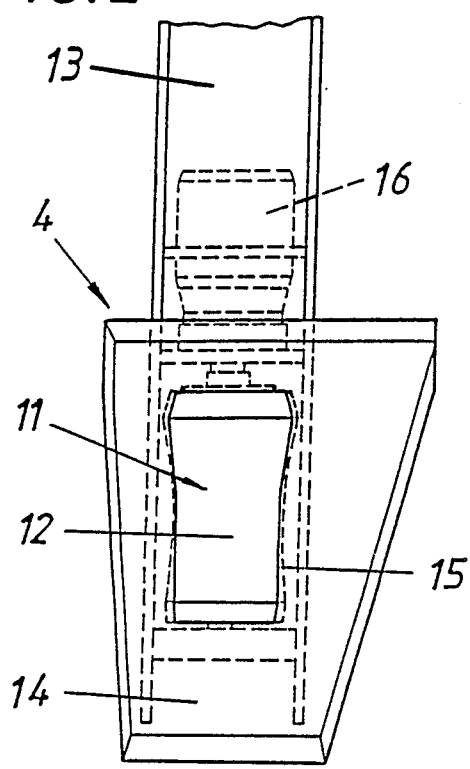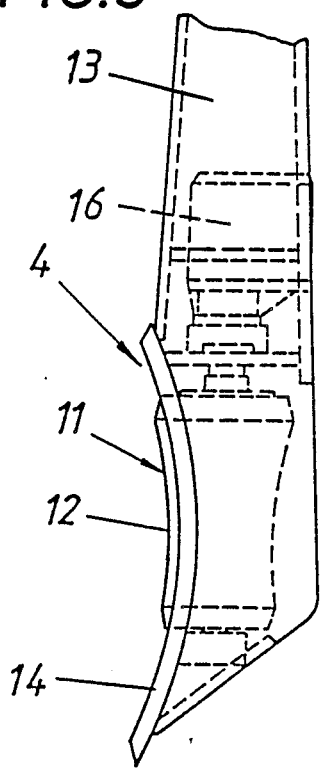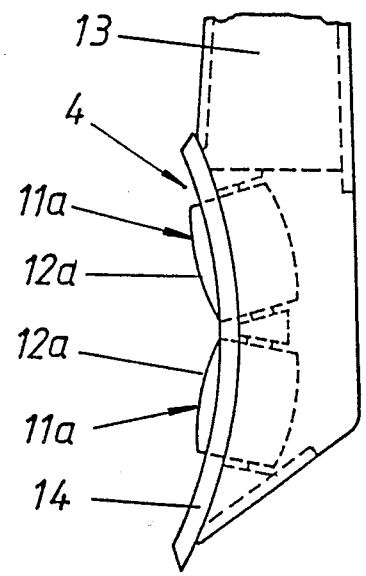

IMPLEMENT FOR LOPPING FELLED TREES

BACKGROUND OF THE INVENTION

1. Field of the Invention

This invention relates to an implement for lopping felled trees, comprising a frame, which is adapted to be suspended from a lifting tackle and is provided with gripping members for engaging a treetrunk from below, with feeding means for imparting a longitudinal movement to the treetrunk and with lopping tools, which are distributed around the periphery of the treetrunk, and is preferably provided with a cross-cutting tool, which is operable to move transversely to the longitudinal feeding direction.

2. Description of the Prior Art.

Such lopping implements are suspended from a suitable lifting tackle consisting in most cases of a crane, which is mounted on a separate chassis, and for a lopping of felled trees are lowered onto the tree which has been felled. As the implement is lowered, the grippers are open and they subsequently engage the treetrunk from below and hold and guide it as it is processed. When the implement has been applied to the treetrunk and has subsequently been raised, the feeding means move the tree past the lopping tools, which have knife edges facing opposite to the feeding direction and which may be secured to separate toolholders or directly to gripper arms of the gripping members. As a result, the tree is lopped throughout the periphery of the treetrunk as the tree is pulled through the implement. A cross-cutting device may optionally be provided for cross-cutting the treetrunk when the tree has been lopped so that felled trees can efficiently be treated.

To pull the tree, when it has been embraced by the grippers, through the lopping tools, a considerable feeding force is required and must be exerted by suitable feeding means. As is apparent from German Patent Specification Nos. 28 11 660 and 28 55 430 or by Published German Patent Application Nos. 37 12 302 and 37 12 303, known feeding means comprise coupling rollers or coupling chains, which are adapted to forcibly engage the treetrunk and are operable to move the felled tree in its longitudinal direction. From U.S. Pat. No. 4,515,192 it is also known that coupling rollers for feeding relatively smooth treetrunks may be movably mounted on the gripping members. But as the tree is fed, the considerable frictional forces between the slide jaws of the gripping members and the treetrunk will often give rise to trouble, particularly if the treetrunk is large in diameter. Such trouble may reside in that the treetrunk becomes stuck in the implement or the feeding means slip on the treetrunk. Such instances will require an interruption of the operation of the implement and will also result in considerable damage to the treetrunks.

SUMMARY OF THE INVENTION

It is an object of the invention to eliminate these disadvantages and to provide an implement which is of the kind described first hereinbefore and which permits an operation with a lower feeding power and ensures a troublefree, non-damaging lopping operation.

That object is accomplished in accordance with the invention in that at least one roller for laterally supporting the treetrunk is provided and carried by a gripping member and is mounted thereon for rotation on an axis which is at right angles to the feeding direction. Such rollers will reduce the proportion of sliding friction involved in feeding the trees and owing to the rolling friction involved will facilitate the feed movement even if the treetrunk is large and high pressures are applied by the gripping members. As a result, there will be no risk of trouble arising even during the lopping of trees having trunks in a very wide range of diameters and the fact that the trees can be fed more easily will substantially inhibit a slipping of the feeding means and only a small damage may be inflicted to the treetrunk.

The rolling surface of the rollers may be concave and/or profiled so that they can well adapt themselves to the surface of the treetrunks. Profiled rolling surfaces will improve the grip of the roller on the treetrunk and will assist the rolling of the rollers. Within the scope of the invention a gripping member may be provided with a pair of rollers rather than with one concave roller and the rolling surfaces of said pair of rollers may preferably be convex and/or profiled so that their adaptation to treetrunks differing in diameter will be further improved.

In a particularly desirable arrangement at least one roller is adapted to be driven because such a driven roller will assist the feeding of the treetrunk. That roller may be driven by a hydraulic drive, which can easily be supplied with hydraulic liquid from the hydraulic system of the vehicle carrying the lifting tackle.

In a desirable design within the scope of the invention, one or more rollers are arranged behind a slide jaw of a gripping member and have rolling surfaces which protrude toward the treetrunk through an aperture of the slide jaw. In such an arrangement the roller or rollers will be protected by the slide jaw but can still perform its or their function to support the treetrunk.

If the roller or rollers are adjustably supported by means by which the overhang of the roller or rollers from the slide jaw can be adjusted, it will be possible to adjust said overhang in dependence on various conditions or species of trees and to achieve an optimum cooperation of the slide jaw and the roller or rollers.

Within the scope of the invention the roller or rollers may be movably mounted on a gripper arm rather than on a slide jaw and gripping members may be used which comprise no slide jaws. To ensure that such an arrangement will not render more difficult the engaging of a treetrunk from below and a lifting of the treetrunk, the gripping member may be provided at its free end with a wedgelike projection and/or such gripping member may be combined with other gripping members which comprise slide jaws or scoops.

BRIEF DESCRIPTION OF THE DRAWING

FIGS. 2 and 3 are a top plan view and an end view, respectively, and show on a larger scale a gripping member of the implement of FIG. 1.

FIG. 4 is an end view that is similar to FIG. 3 and shows a modified gripping member.

DETAILED DESCRIPTION OF THE PREFERRED EMBODIMENTS

Figure 1:
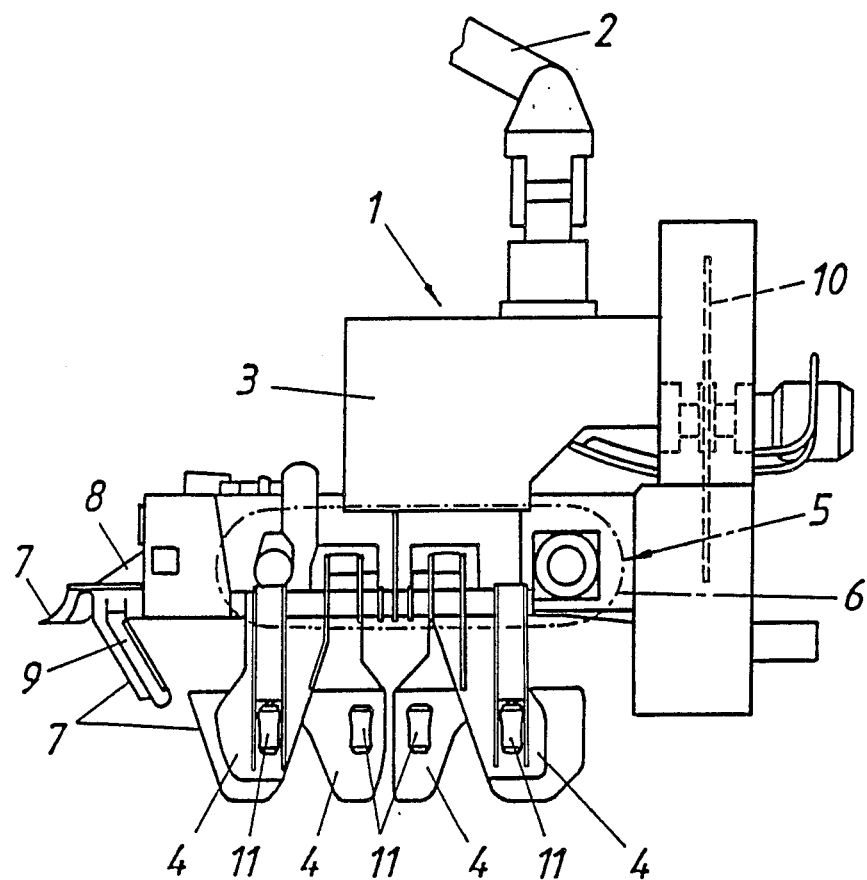
FIG. 1 is a side elevation showing a lopping implement in accordance with the invention.

Two illustrative embodiments of the invention are strictly diagrammatically shown in the drawing.

An implement 1 for efficiently lopping felled trees comprises a frame 3, which is adapted to be suspended from a jib 2 of a lifting tackle, which is not shown in more detail. The frame 3 is provided with downwardly protruding, pivoted grippers 4 for engaging a treetrunk from below and for holding the treetrunk, and with feeding means 5, which comprise a revolving endless coupling chain 6 for engaging the treetrunk and for imparting a longitudinal movement to the treetrunk when it has been embraced by the gripping members 4. In its tree-receiving portion the frame 3 is also provided with lopping tools 7, which are distributed around the periphery of the treetrunk. To permit an adaptation of the lopping tools 7 to the treetrunk diameter of a tree which is to be lopped, said lopping tools 7 are secured to movable toolholders 8 or to pivoted arms 9 or directly to the gripping members 4 provided at the entrance end of the frame 3. When a treetrunk has been embraced by the gripping members 4 and the coupling chain 6 of the feeding means 5 is operated to move the treetrunk in its longitudinal direction between the lopping tools 7, the tree will automatically be lopped throughout the periphery of the treetrunk. In order to permit lopped treetrunk sections to be severed by the implement from the remainder of the treetrunk, the frame 3 is provided at its delivery end with a merely diagrammatically indiacated cross-cutting tool 10, which may consist, e.g., of a circular saw. When a treetrunk has been lopped in a portion having a measured length, the feeding means 5 will be stopped and the cross-cutting tool 10 can be operated to saw off the lopped portion of the treetrunk.

In order to facilitate the longitudinal feeding and to reduce the friction incurred as the treetrunk is pulled through the frame 3, each gripping member 4 carries a roller 11, which laterally supports the treetrunk and is mounted for rotation on an axis that is at right angles to the feeding direction. For an adaptation of the rollers 11 to the curved peripheral surface of the treetrunk the rollers have a concave rolling surface 12. An improved grip will be achieved if the roller surface 12 is formed with a profile.

Each gripping member 4 consists of a gripper arm 13 and a slide jaw 14 carried by the gripper arm 13 and the roller 11 is so arranged on the gripping member 14 behind the slide jaw 14 that the rolling surface 12 of the roller 11 protrudes through a suitable aperture 15 of the slide jaw 14. As a result, the rollers 11 will be protected by the slide jaws 14 during the rough lopping operation and the rollers 11 and slide jaws 14 will cooperate in the desired manner to embrace and guide the treetrunks.

The rollers 11 may be adapted to be driven by a motor, such as a diagrammatically indicated hydraulic rotary motor 16, so that the feeding means 5 will be relieved and the lopping operation will further be improved.

As is indicated in FIG. 4, each gripping member may be provided with a pair of rollers 11a rather than with a concave roller 11 and the pair of rollers 11a may have convex rolling surfaces 12a so that they can also well be engaged with treetrunks differing in diameter. For the sake of simplicity, only the upper roller 11a of each pair will be driven in that case.

I claim:

1. An implement for lopping a felled tree having a treetrunk, comprising
   a frame,
   a plurality of gripping means movably mounted in said frame for engaging a lower half of said treetrunk,
   feeding means mounted in said frame for engaging and longitudinally moving said treetrunk in a predetermined longitudinal direction when said treetrunk is engaged by said gripping means,
   lopping means for lopping branches from said treetrunk, said lopping means being mounted in said frame and distributed around a periphery of said treetrunk when said treetrunk is engaged by said gripping means,
   a roller carried by and mounted on one of said gripping means for rotation on an axis which is transverse to said longitudinal direction, said roller laterally supporting said treetrunk when it is engaged by said gripping means,
   at least one of said gripping means comprising slide jaw means for slidably engaging said treetrunk laterally on one side of said lower half of said treetrunk, said slide jaw means including an aperture facing said one side of said lower half of said treetrunk,
   said roller having a rolling surface which protrudes from said aperture of said slide jaw means to make contact with said treetrunk when said treetrunk is engaged by said gripping means, and
   means for adjusting an overhang of said roller toward said treetrunk when said treetrunk is engaged by said gripping means.

2. The implement of claim 1 further comprising means for suspending said frame from a lifting tackle, said frame being lifted and lowered by said lifting tackle.

3. The implement of claim 1 further comprising a cross-cutting tool mounted in said frame and being movable at a right angle to said longitudinal direction.

4. The implement of claim 1 wherein said roller is mounted on one of said gripping means for rotation about an axis which is at a right angle to said longitudinal direction.

5. The implement of claim 1 comprising at least one pair of said rollers rotatably mounted on at least one of said gripping means.

6. The implement of claim 5 wherein said rollers of said pair have convex rolling surfaces.

7. The implement of claim 5 wherein said rollers of said pair have profiled rolling surfaces.

8. The implement of claim 5 wherein said rollers of said pair have profiled convex rolling surfaces.

9. The implement of claim 1 wherein said roller has a concave rolling surface.

10. The implement of claim 1 wherein said roller has a profiled rolling surface.

11. The implement of claim 1 wherein said roller has a profiled concave rolling surface.

12. The implement of claim 11 wherein at least one of said gripping means comprises a gripper arm that is movably mounted in said frame, said roller being carried by and mounted on said gripper arm for rotation on an axis which is transverse to said longitudinal direction.

13. The implement of claim 1 wherein said plurality of gripping means comprises a plurality of pairs of gripping members movably mounted in said frame, the gripping members of each of said pairs being oppositely disposed on said frame, at least one gripping member of each pair of gripping members including one of said rollers.

14. The implement of claim 1 wherein said plurality of gripping means comprises two sets of gripping members disposed on respective opposite sides of said frame, at least one gripping member of each of said sets including at least one of said rollers.

* * * * *